C. MOORE.
SHOCK ABSORBER.
APPLICATION FILED OCT. 30, 1918.
1,316,500.
Patented Sept. 16, 1919.
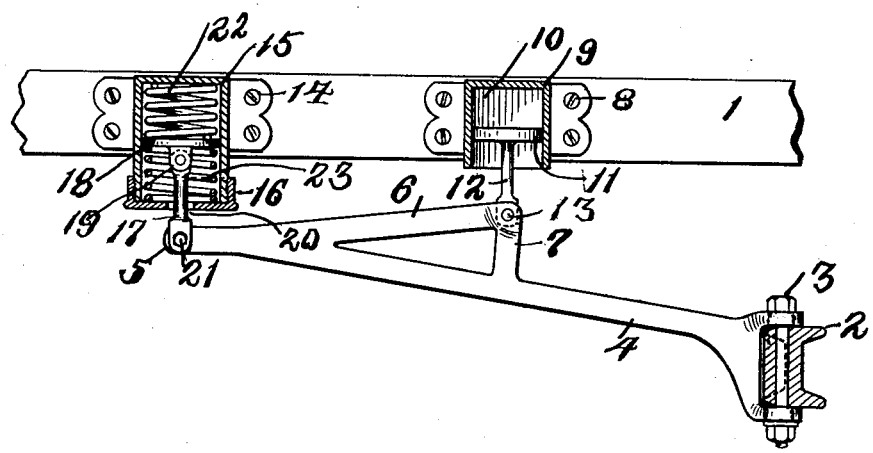
INVENTOR–
Christian Moore,
By C. E. Humphrey
ATTORNEY.

UNITED STATES PATENT OFFICE.

CHRISTIAN MOORE, OF AKRON, OHIO.

SHOCK-ABSORBER.

1,316,500. Specification of Letters Patent. Patented Sept. 16, 1919.

Application filed October 30, 1918. Serial No. 260,409.

*To all whom it may concern:*

Be it known that I, CHRISTIAN MOORE, a citizen of the United States, residing at Akron, in the county of Summit and State of Ohio, have invented new and useful Improvements in Shock-Absorbers, of which the following is a specification.

This invention relates to a combined shock absorber and cushioning element especially adapted for use on vehicles such as automobiles. The object of the invention is to provide a cushioning and shock absorbing mechanism whereby the movement of the frame or chassis with respect to an axle of the vehicle is cushioned to reduce the amount of vibration and movement of the body portion of the vehicle and to render the use of the vehicle thereof easier and compensate for obstructions or bumps in the roadway.

The drawing presented is a view in side elevation and partly in section of so much of a frame of an automobile and an axle used in connection therewith and showing in operative connection therewith my improved shock absorber and cushioning device.

In order to illustrate the invention in its simplest form the reference numeral 1 denotes one side frame or a chassis of an automobile and 2 an axle therefor. Secured to the axle 2 by suitable means such as a bolt 3 is an arm 4 preferably having a forked and apertured end through which the bolt 3 extends. This arm extends longitudinally of the automobile and at an inclination and terminates in an apertured end 5. Formed integrally with the arm 4 is a brace 6 which is united with the arm 4 by means of a cross-bar 7. At the junction of the brace 6 and arm 7 is an aperture for a purpose to be later described. Secured by holding means 8 to the side of the frame 1 is an inverted dash-pot 9 comprising a cylinder open at its lower end and in it is a movable piston 11 provided with a piston-rod 12 the lower end of which is pivotally connected with a pin 13 connecting it with the joint between the members 6 and 7, the connection permitting slight pivotal movement of the piston-rod 12 during the upward and downward movement of the member 11 within the cylinder 10.

Secured to the frame 1 by means of holding members 14 is a member embodying an inverted cylinder 15 the lower end of which is threaded to receive a cap or closure member 16 having an enlarged opening 20. Vertically shiftably mounted in the cylinder 15 is a loose head 18 the external diameter of which substantially approximates the internal diameter of the cylinder 15 and is slidable therein. This head is provided with a lug 19 to which is connected a link 17 the lower end of which is secured to the end 5 of the arm 4 by means of pivot pin 21. Positioned above the head 18 is a coiled-spring 22 and below said head and extending therefrom to the cap 16 is a coiled-spring 23. The link 17 is capable of free movement in the opening 20 in the cap 16 during the movement of the parts of the device as further hereinafter described. The springs 22 and 23 are of a suitable diameter to form a working fit within the interior of the cylinder 15 and be guided in their movements by the wall of the cylinder 15.

In operation the member 1 designates, as before stated, the frame or chassis of an automobile and the axle 2 thereof, being positioned below said frame is adapted to move upwardly and downwardly with respect to said frame and the frame to move upwardly and downwardly with respect to the axle and to cushion or reduce the shock incident to the use of the vehicle. It is contemplated that when an obstruction is encountered by the wheels of the vehicle the axle 2 will be shifted upwardly thereby moving the arm 4 upwardly forcing the piston 11 upwardly into the cylinder of the dash pot 9 and as the latter contains some such elastic fluid as air a cushioning effect is thereby obtained and a downward movement of the axle 2 will be cushioned due to the fact that during the upward movement of the piston 11 a partial vacuum is created back or above the piston 11 so that its downward movement is gradual or retarded.

At the same time the downward movement of the frame or chassis 1 is cushioned by the resistance of the spring 22 above the head 18 on the link 17 which coöperates with the dash-pot 9 and as the chassis or frame 1 moves upward its movement is retarded or checked by the spring 23 which is positioned between the head 18 and the cap or closure member 16 of the cylinder. The two members or mechanisms embraced within the cylinder 15 and the dash-pot 19 are adapted to work either simultaneously or alternately to enable a rocking or yielding movement of the chassis with respect to the axle 2 on which are mounted the wheels of the vehicle and also to prevent the upward movement of the wheels carrying the axle 2 with respect to the chassis and cushion and retard the movement of one with respect to the other and at the same time absorb any shock due to a sudden movement of one with respect to the other.

I claim,

A shock absorber for vehicles comprising in combination with a chassis and an axle, a rigid bar secured at one end to said axle, an inverted dash pot fixed to the chassis and overlying the bar midway the ends thereof, a piston working in said dash pot and having its stem pivotally connected to said arm, an inverted cup carried by the chassis adjacent the free end of said arm, a pair of coil springs within said cup, a plate separating the springs, a link connecting the plate to the adjacent end of the arm, and a cap for the lower end of the cup, said dash pot and spring cup coöperating to prevent shocks and to insure a cushioned rise and fall of said axle.

In testimony whereof I have hereunto set my hand.

CHRISTIAN MOORE.

Copies of this patent may be obtained for five cents each, by addressing the "Commissioner of Patents, Washington, D. C."